United States Patent [19]

Kaneko

[11] Patent Number: 4,504,766

[45] Date of Patent: Mar. 12, 1985

[54] CHIP TYPE DISCHARGE ELEMENT WITH LAMINATED INSULATING SHEETS

[75] Inventor: Toshimi Kaneko, Takefu, Japan

[73] Assignee: Murata Manufacturing Co., Ltd., Japan

[21] Appl. No.: 409,026

[22] Filed: Aug. 18, 1982

[30] Foreign Application Priority Data

Aug. 25, 1981 [JP] Japan .......................... 56-126290[U]

[51] Int. Cl.³ ......................... H01J 61/30; B32B 3/04

[52] U.S. Cl. .................................... 313/634; 313/636; 428/138

[58] Field of Search ................. 313/634, 636; 428/138

[56] References Cited

U.S. PATENT DOCUMENTS 2,644,113 6/1953 Etzkorn .......................... 313/607 X
2,876,374 3/1959 Riggen ............................ 313/495 X
3,788,723 1/1974 Lehrer ............................ 313/635 X
4,231,660 11/1980 Remy et al. .................... 428/138 X

FOREIGN PATENT DOCUMENTS 1198568 7/1970 United Kingdom .

*Primary Examiner*—Palmer Demeo
*Attorney, Agent, or Firm*—Ostrolenk, Faber, Gerb & Soffen

[57] ABSTRACT

A chip type discharge element which discharges when a voltage of a predetermined value or greater is applied thereto. It serves to protect electronic components and comprises at least one bored insulating sheet sandwiched in layers between two insulating sheets to thereby close therewith a bore formed at the bored insulating sheet, at least two electrode films provided thereon and extending from the bore to both lengthwise sides of the insulating sheets and partly facing each other across the bore, and exterior electrodes provided at the outer sides of the layered insulating sheets so that the electrode films are electrically connectible to the exterior end of the electrode films. The gap between electrode films opposite to each other across the bore at the bored insulating sheet can be controlled whereby a chip type discharge element discharging at low voltages is obtainable.

6 Claims, 7 Drawing Figures

CHIP TYPE DISCHARGE ELEMENT WITH LAMINATED INSULATING SHEETS

BACKGROUND OF THE INVENTION

The present invention relates to a chip type discharge element which discharges when a predetermined voltage is applied thereto. Such elements are used to protect electronic circuits from the application for excessive voltages.

Present electronic circuits are formed predominantly of semiconductor elements, such as transistors or integrated circuits. To protect these semiconductor elements from abnormal voltages, it is necessary to use discharge elements which discharge at low voltages.

For this purpose, discharge elements of various construction have been proposed. Examples of such known elements are shown in FIGS. 1 through 3.

The discharge element shown in FIG. 1 comprises electrode parts 14 and 15 formed at one end of lead wires 12 and 13, respectively, and encased in a glass tube 11. The electrode parts 14 and 15 are separated from each other by a small gap so that discharge takes place between the electrode parts 14 and 15. The glass tube 11 forms a sealed chamber containing an inert gas or a vacuum.

A discharge element of the foregoing type which requires a sealed glass tube 11 is expensive to manufacture, is large in size, and makes it difficult to determine the dimension of the gap.

The discharge element shown in FIG. 2 includes electrode films 23 and 24 provided on respective opposed surfaces of a disc shaped ceramic substrate 22 having a bore 21 formed at the central portion thereof. The electrode films 23 and 24 are soldered to lead wires 25 and 26, respectively, and the bore 21 is closed by two ceramic plates 27 and 28. The element as a whole is molded by an insulating resin 29, so that electrical discharge takes place between the electrode films 23 and 24 at the portions thereof surrounding the bore 21.

Such a discharge element, however, is inadequate in that many parts are required which increase the material cost, increase the size and decrease the lifetime of such discharge elements.

Further, the discharge element shown in FIG. 3 has lead wires 31 and 32 opposite to each other at ends **31*a* and 32*a* thereof within a space 34 formed in an insulating resin block 33, whereby discharge takes place between the ends 31*a* and 32*a* of lead wires 31 and 32**.

A vacuum cannot be formed in the space 34 within the insulating resin block 33 with the result that the gap between the ends **31*a* and 32*a* of the lead wires 31 and 32** should be made smaller. However, the dimension of the gap is structurally difficult to obtain, especially when the size of the gap is small, thus making it very difficult to get a discharge element to discharge at low voltages.

SUMMARY OF THE INVENTION

An object of the invention is to provide a chip type discharge element which is small and capable of discharging at low voltages.

Another object of the invention is to provide a chip type discharge element which can be manufactured by the same process as standard laminated chip condensers or the like and which can directly use the manufacturing equipment therefor.

Still another object of the invention is to provide a chip type discharge element which is capable of being automatically mounted onto a printed substrate and is free from deterioration caused by carbonization, because of the absence of organic material, such as insulating resin.

BRIEF DESCRIPTION OF THE DRAWINGS

These and other objects and features of the present invention will best be understood from the following description of embodiments thereof when read in connection with the accompanying drawings, in which.

DETAILED DESCRIPTION OF THE INVENTION

A first embodiment of the invention shown in FIGS. 4 and 5 will be described first.

A pair of central insulating sheets 41 and 42 have rectangular bores 43 and 44, respectively, formed therein. The relative positions of the bores 43, 44 are selected so that the bores overlap each other as best shown in FIG. 4. A pair of outer insulating sheets 45 and 46 are laminated to surfaces of the central insulating sheets 41 and 42, respectively, to close the bores 43 and 44. The insulating sheets 41, 42, 45 and 46 may be formed of, for example, a plurality of ceramic green sheets in layers or a single ceramic green sheet.

Figure 5:
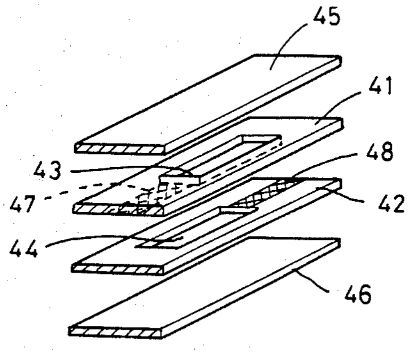
FIG. 5 is a perspective exploded view of the FIG. 4 embodiment.

The central insulating sheet 41, as shown in FIG. 5 is provided on its surface facing the other central insulating sheet 42 with an electrode film 47 extending from the smaller side of rectangular bore 43 to one lengthwise side of the one sheet 41.

The other central insulating sheet 42 is similarly provided on its surface facing the central insulating sheet 41 with an electrode film 48 extending from the smaller side of the bore 44 to one lengthwise side of the sheet 41.

Figure 4:
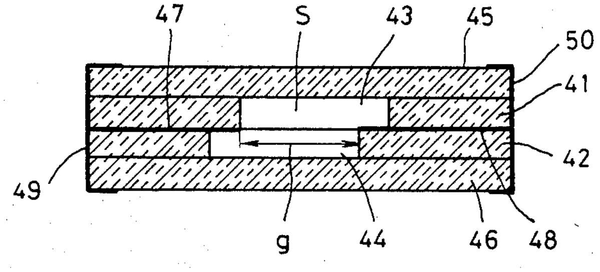
FIG. 4 is a sectional view of a first embodiment of a chip type discharge element of the invention.

The rectangular bore 43 formed in central insulating sheet 41 is formed slightly to the right of center as viewed in FIG. 4 and the bore 44 formed in the central sheet 42 is formed slightly to the right of center as viewed in FIG. 4 so the bores 43 and 44 are shifted laterally from each other and partially communicate with each other when the sheets are laminated to one another as shown in FIG. 4. The respective electrode films 47 and 48 are partially exposed within a space S formed by both the bores 43 and 44. Alternatively, both the bores 43 and 44 may be coincident in position, wherein the electrode films 47 and 48 are exposed on the opposite walls in the space S.

Thus, the chip type discharge element of the first embodiment of the invention comprises a pair of central insulating sheets 41 and 42 having bores formed therein which overlap each other, the central insulating sheets 41, 42 being sandwiched in layers between a pair of outer insulating sheets 45 and 46, the electrode films 47 and 48 being formed on respective surfaces of the central sheets 41, 42 and being spaced from one another by a gap located in a space defined by the bores, and exterior electrode films 49 and 50 electrically coupled to and films 47 and 48, respectively, and being provided at respective lengthwise end faces of the laminated insulating sheets 41, 42, 45 and 46.

Accordingly, the discharge element of the aforementioned construction is similar to and can be manufactured by the process used for manufacturing a chip type laminated condenser.

When the position or dimension of bores 43, 44 are charged, the discharge gap between the electrode films 47 and 48 changes so that the voltage at which the chip type discharge element discharges is reduced by reducing the side of the discharge gap.

In the first embodiment described above, the central insulating sheets 41 and 42 and the outer insulating sheets 45 and 46 are fired in the laminated condition to form a chip type device. During this operation, there is a possibility that the insulating sheet materials 45 and 46 will be deformed due to expansion of air in the space S during the firing operation.

In order to avoid the above problem, the laminated sheets as a whole are encased in the metallic mold and are held together during firing. In this case, it is preferable to allow the air to escape from the space S through a side bore provided in the sheet and thereafter close the side bore under pressure.

Figure 1:
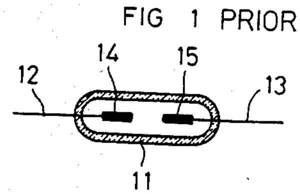
FIG 1 PRIOR ART
FIG. 1 is a sectional view of a first example of a conventional discharge element.
Figure 2:
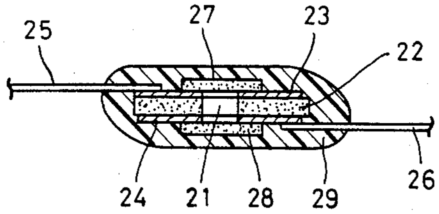
FIG 2 PRIOR ART
FIG. 2 is a sectional view of a second example of the same.
Figure 3:
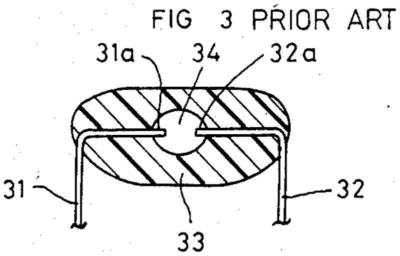
FIG 3 PRIOR ART
FIG. 3 is a sectional view of a third example of the same.
Figure 6:
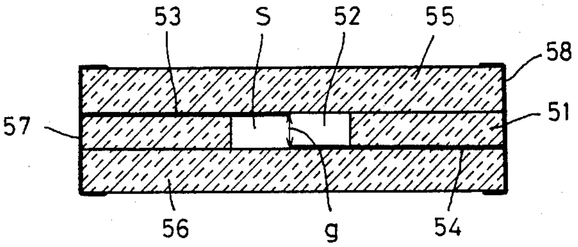
FIG. 6 is a sectional view of a second embodiment of a chip type discharge element of the invention.
Figure 7:
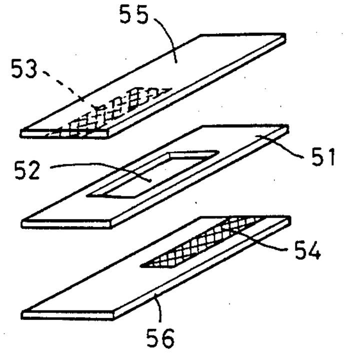
FIG. 7 is a perspective exploded view of the FIG. 6 embodiment.

A second embodiment of the invention is shown in FIGS. 6 and 7. This embodiment comprises a single central insulating sheet 51 having a rectangular bore 52 at the center thereof, the sheet 51 being sandwiched between two outer insulating sheets 55 and 56. Electrode flms 53 and 54 are provided on opposing surfaces of the outer sheets 55, 56, respectively, and are connected to exterior electrode films 57, 58, respectively, which are formed at respective lengthwise side faces of the laminated sheets 51, 55, and 56.

Such construction provides a discharge gap g between the electrode films 53 and 54 opposite to each other within the bore 52 having a size determined by the thickness of the central insulating sheet 51, so that the use of thin insulating sheet 51 can provide a discharge element which discharges at a low voltage. Alternatively, the electrode films 53 and 54 may be reduced in size to form a slanting discharge gap g within the space S of the bore 52.

In both the aforesaid embodiments, the electrode films 47, 48, 53, and 54 may alternatively be divided into a plurality of electrode films and also the central insulating sheets 41 and 42 and outer insulating sheets 45, 46, 55 and 56 may be formed of a glass material instead of ceramic.

As seen from the above, the discharge element of the invention has the electrode films located opposite to each other across a space defined by a bore located in the central sheets so that the gap between the electrode films may be made small, whereby a discharge element capable of discharging at low voltages is obtainable. .

Also, the discharge element of the invention can be manufactured by the same process as for usual laminated chip condensers and by direct use of the equipment for manufacturing chip condensers.

What is claimed is:

1. A chip-type discharge element, comprising:

a central insulating sheet having a bore therethrough;

first and second insulating sheets sandwiching said central insulating sheet, said first and second insulating sheets being laminated to respective opposing sides of said central insulating sheet to enclose said bore, each of said insulating sheets including opposite first and second lateral sides, said first lateral side of each of said sheets lying in a common first plane, said second lateral side of each of said sheets lying in a common second plane spaced from said first plane;

a first electrode film located on said first insulating sheet and extending from said first lateral side of said first insulating sheet to a position on said first insulating sheet which is located no more than half-way into an area on said first insulating sheet bounded by said bore;

a second electrode film located on said second insulating sheet and extending from said second lateral side of said second insulating sheet to a portion of said insulating sheet located no more than half-way into an area on said second insulating sheet bounded by said bore such that said electrode films do not overlap one another; and first and second exterior electrode films formed on said first and second lateral sides of said insulating sheets, respectively, and being electrically coupled to said first and second electrode films, respectively.

2. The chip-type discharge element of claim 1, wherein said insulating sheets comprise green ceramic sheets which are fired in layers to one another.

3. The chip-type discharge element of claim 1, wherein said insulating sheets are formed of glass and are laminated to one another.

4. A chip-type discharge element, comprising:

a first central insulating sheet having first and second opposed planar surfaces and a first bore extending between said planar surfaces;

a second central insulating sheet having first and second opposed planar surfaces and a second bore extending between said planar surfaces, said first planar surfaces of said central insulating sheets being bonded to one another with said bores overlapping one another, said first and second central insulating sheets having first and second opposite lateral sides, said first lateral sides lying in a first plane, said second lateral sides lying in a second plane spaced from said first plane;

a first electrode film formed on said first planar surface of said first central insulating sheet and extending from said first lateral side of said first central insulating sheet to said first bore;

a second electrode film formed on said first planar surface of said second central insulating sheet and extending from said second lateral side of said second central insulating sheet to said second bore;

first and second outer insulating sheets sandwiching said first and second inner sheets, said first and second outer insulating sheets being laminated to said second surface of said first and second inner insulating sheets, respectively to enclose said bores; and first and second exterior electrodes found on said first and second lateral sides, respectively, of said first and second insulating sheets and being electrically coupled to said first and second electrode films, respectively.

5. The chip-type discharge element of claim 4, wherein said first and second central insulating sheets and said first and second outer insulating sheets comprise green ceramic sheets which are fired in layers to one another.

6. The chip-type discharge element of claim 4, wherein said first and second central insulating sheets and said first and second outer insulating sheets are formed of glass and are laminated to one another.

* * * * *